(12) United States Patent
Harrup et al.

(10) Patent No.: US 7,217,755 B2
(45) Date of Patent: May 15, 2007

(54) ORGANIC/INORGANIC NANOCOMPOSITES, METHODS OF MAKING, AND USES AS A PERMEABLE REACTIVE BARRIER

(75) Inventors: Mason K. Harrup, Idaho Falls, ID (US); Frederick F. Stewart, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 289 days.

(21) Appl. No.: 10/732,863

(22) Filed: Dec. 9, 2003

(65) Prior Publication Data

US 2005/0124748 A1    Jun. 9, 2005

(51) Int. Cl.
C08K 3/34 (2006.01)
(52) U.S. Cl. .................. 524/430; 524/414; 210/681; 210/688
(58) Field of Classification Search ............... 210/170, 210/660, 681, 679, 682, 688, 747; 524/430, 524/492
See application file for complete search history.

(56) References Cited

U.S. PATENT DOCUMENTS

| | | | |
|---|---|---|---|
| 3,817,911 A | 6/1974 | Taylor | |
| 4,636,314 A * | 1/1987 | Beuhler et al. | 210/500.25 |
| 4,772,660 A | 9/1988 | Kitamura et al. | |
| 4,827,005 A | 5/1989 | Hilterhaus | |
| 5,728,302 A * | 3/1998 | Connor et al. | 210/679 |
| 5,857,810 A * | 1/1999 | Cantrell et al. | 405/263 |
| 6,146,787 A | 11/2000 | Harrup et al. | |
| 6,217,775 B1 | 4/2001 | Conca et al. | |
| 6,254,786 B1 | 7/2001 | Carpenter et al. | |
| 6,357,968 B1 | 3/2002 | Dwyer et al. | |
| 6,398,960 B1 | 6/2002 | Borden et al. | |
| 6,403,364 B1 | 6/2002 | Hince | |
| 6,403,755 B1 | 6/2002 | Stewart et al. | |
| 6,423,531 B1 | 7/2002 | Hince et al. | |
| 6,428,695 B1 | 8/2002 | Naftz et al. | |
| 6,432,693 B1 | 8/2002 | Hince | |
| 6,524,485 B1 | 2/2003 | Dubin et al. | |
| 6,544,690 B1 | 4/2003 | Harrup et al. | |
| 6,610,780 B1 * | 8/2003 | Payzant et al. | 524/789 |
| 2001/0033772 A1 * | 10/2001 | Gilmore et al. | 405/128.75 |
| 2002/0032272 A1 * | 3/2002 | Sievers et al. | 524/501 |
| 2002/0121470 A1 * | 9/2002 | Mann et al. | 210/287 |
| 2005/0051492 A1 * | 3/2005 | Tranter et al. | 210/688 |

OTHER PUBLICATIONS

Onodera, Yoshio. A New Granular Composite with High Selectivity for Cesium Ion Prepared from Phosphomolybdic Acid Hydrate and Inorganic Porous Material. 1999. Separation Science and Technology, vol. 24, No. 34, p. 2347-2354.*

Gaur, Sushma. Determination of Cs-137 in Environmental Water by Ion-Exchange Chromatography. May 1996. Journal of Chromatography A. vol. 733, Issues 1-2, p. 57-71.*

Hawley's Condensed Chemical Dictionary. John Wiley & Sons, Inc. 14th Edition, 2002.*

Wertsching, A., et al., Examination of the Physical Properties of Polyphosphazene-Silicate Nanocomposites Using Novel Synthetic Strategies, a submission to Composite Interfaces, Idaho Nat'l. Eng. and Environmental Lab.

Caruana, Alex, 1,200-Foot Permeable Reactive Barrier in Use at the Denver Federal Center, State of Colorado, Dept. of Health and Environment.

Novak, Bruce M., et al., Simultaneous Interpenetrating Networks of Inorganic Glasses and Organic Polymers, New Routes into Nonshrinking Sol-Gel Derived Composites, Dept. of Chem., Univ. of California at Berkeley, pp. 698-699.

David, I.A., et al., A Molecular Organic/Inorganic Semi-Interpenetrating Network, Du Pont Central Research and Development Experimental Station, pp. 530-531.

Messersmith, P.B., et al., Synthesis of New Materials: Organoceramics, Univ. of Illinois, Dept. of Materials Science and Eng., pp. 536-537.

Bungay, P.M., et al. (eds.), Synthetic Membranes: Science, Engineering and Applications, NATO ASI Series, Series C: Mathematical and Physical Sciences vol. 181, pp. 57-107, 1986, D. Reidel Publishing Co.

Sebesta, F., et al., Composite Ion Exchanger with Ammonium Molybdophosphate and its Properties, Journal of Radioanalytical and Nuclear Chem., vol. 140, No. 1 (1990), pp. 15-21.

(Continued)

Primary Examiner—Edward J. Cain
(74) Attorney, Agent, or Firm—TraskBritt

(57) ABSTRACT

Nanocomposite materials having a composition including an inorganic constituent, a preformed organic polymer constituent, and a metal ion sequestration constituent are disclosed. The nanocomposites are characterized by being single phase, substantially homogeneous materials wherein the preformed polymer constituent and the inorganic constituent form an interpenetrating network with each other. The inorganic constituent may be an inorganic oxide, such as silicon dioxide, formed by the in situ catalyzed condensation of an inorganic precursor in the presence of the solvated polymer and metal ion sequestration constituent. The polymer constituent may be any hydrophilic polymer capable of forming a type I nanocomposite such as, polyacrylonitrile (PAN), polyethyleneoxide (PEO), polyethylene glycol (PEG), polyvinyl acetate (PVAc), polyvinyl alcohol (PVA), and combinations thereof. Nanocomposite materials of the present invention may be used as permeable reactive barriers (PRBs) to remediate contaminated groundwater. Methods for making nanocomposite materials, PRB systems, and methods of treating groundwater are also disclosed.

55 Claims, 8 Drawing Sheets

OTHER PUBLICATIONS

Novak, Bruce M., Hybrid Nanocomposite Materials—Between Inorganic Glasses and Organic Polymers, VCH Verlagsgesellschaft mbH, D-69469, Weinheim, 1993, pp. 422-433.

Wen, Jianye, et al., Organic/Inorganic Hybrid Network Materials by the Sol-Gel Approach, Chem. Mater., vol. 8, No. 8, 1996, pp. 1667-1681.

Benner, S.G., et al., Porous Reactive Wall for Prevention of Acid Mine Drainage: Results of a Full-Scale Field Demonstration, International Containment Technology Conference, Conference Proceedings, Feb. 9-12, 1997, pp. 835-843.

Powell, Robert M., et al., Permeable Reactive Barrier Technologies for Contaminant Remediation, EPA/600/R-98/125, Sep. 1998, pp. 1-94, U.S. Gov't. Printing Office.

Satyanarayana, J., et al., Adsorption Studies of Cesium on a New Inorganic Exchanger Ammonium Molybdophosphate—Alumina (AMP—A1203), Journal of Radioanalytical and Nuclear Chem., vol. 242, No. 1 (1990), pp. 11-16.

Field Applications of In Situ Remediation Technologies: Permeable Reactive Barriers, U.S. Environmental Protection Agency, EPA-542-R-99-002, Apr. 1999, pp. 1-114.

Moridis, George J., et al., Evaluation of Alternative Designs for an Injectable Subsurface Barrier at the Brookhaven National Laboratory Site, Long Island, New York, Water Resources Research, vol. 35, No. 10, Oct. 1999, pp. 2937-2953.

In Situ Permeable Reactive Barriers: Application and Deployment Training Session, EPA/ITRC/RTDF, Feb. 8-9, 2000,.

Ott, Nichole, Permeable Reactive Barriers for Inorganics, U.S. Environmental Protection Agency, Jul. 2000, pp. 1-58.

Polson, Linda, et al., Synthesis, Characterization, and Ion Sequestration of Novel Nanocomposite Materials (Apr. 2002).

Nanocomposite Permeable Reactive Barrier Research at the INEEL (Feb. 2003).

Wertsching, A., et al., Examination of the Physical Properties of Polyphosphazene-Silicate Nanocomposites Using Novel Synthetic Strategies, a submission to Composite Interfaces, Idaho Nat'l. Eng. and Environmental Lab, 2002.

Caruana, Alex, 1,200-Foot Permeable Reactive Barrier in Use at the Denver Federal Center, State of Colorado, Dept. of Health and Environment, 1998.

Novak, Bruce M., et al., Simultaneous Interpenetrating Networks of Inorganic Glasses and Organic Polymers, New Routes into Nonshrinking Sol-Gel Derived Composites, Dept. of Chem., Univ. of California at Berkeley, pp. 698-699, 1990.

David, I.A., et al., A Molecular Organic/Inorganic Semi-Interpenetrating Network, Du Pont Central Research and Development Experimental Station, pp. 530-531, 1995.

Messermith, P.B., et al., Synthesis of New Materials: Organoceramics, Univ. of Illinois, Dept. of Materials Science and Eng., pp. 536-537, 1991.

* cited by examiner

ORGANIC/INORGANIC NANOCOMPOSITES, METHODS OF MAKING, AND USES AS A PERMEABLE REACTIVE BARRIER

GOVERNMENT RIGHTS

The United States Government has rights in the following invention pursuant to Contract No. DE-AC07-99ID 13727 between the United States Department of Energy and Bechtel BWXT Idaho, LLC.

BACKGROUND OF THE INVENTION

1. Field of the Invention

The present invention relates to type I nanocomposites. More particularly, the present invention relates to type I nanocomposites useful as permeable reactive barriers to selectively remove metal ion contaminants from subsurface contaminated water.

2. State of the Art

Subsurface contaminated groundwater containing cesium or other metals presents an important environmental problem that must be addressed. Several approaches have been used to remediate contaminated groundwater. For instance, research into subsurface walls that prevent the spread of contaminants through the subsurface has been ongoing since about 1990 at Laurence Berkeley National Laboratory (LBNL). These walls, called viscous liquid barriers (VLBs), are designed to control subsurface contaminants by forming an impermeable barrier, allowing nothing, either benign or hazardous, through the wall. VLBs are composed of liquid ceramic precursors that fast-cure in the subsurface to produce a purely ceramic monolith with extremely low permeability. In laboratory tests these walls functioned well, yet during field tests problems were discovered. Specifically, diversion of groundwater flow patterns prevented this technology from being effective.

Another technology that has been used to remediate contaminated groundwater is permeable reactive barriers (PRBs). Generally described, PRBs are underground permeable walls with a reactive material (e.g., iron, compost, limestone, sodium dithionite, or zeolites) that degrades or immobilizes contaminants in groundwater flow. As contaminated water passes through the reactive zone of the PRB, the contaminants are either immobilized or chemically degraded to a more desirable state (e.g., less toxic, more readily biodegradable, etc.). PRBs are installed as permanent, semi-permanent, or replaceable units across the groundwater flow path of a contaminant plume. The barriers may contain reactants, nutrients, or oxygen depending on the contaminant. PRBs can be installed in one of two basic ways: funnel-and-gate or trench. The funnel-and-gate system has impermeable walls that direct the contaminant plume through a gate containing the reactive media. In the trench technique, a trench is installed across the path of the plume and is filled with the reactive media. In both cases the groundwater is able to pass through the media while the contaminant is collected.

The most widely used PRB in remediation projects is the zero valent iron (ZVI) wall. This type of wall, made from iron or an iron containing material, can be placed in the ground in various ways such as, conventionally or via slurry injection, depending upon the demands of a particular site. The ZVI wall functions to remove chlorinated organic contaminants from the subsurface by reductively de-chlorinating these species as contaminated groundwater flows through the wall. While this is an extremely effective remediation technology for halogenated organic contaminants, ZVI walls are not able to effect the removal of most metal ions from subsurface contaminant plumes. Despite these limitations, PRBs are still a relatively new remediation strategy, and offer tremendous advantages once the current technical difficulties are overcome. Examples of permeable barriers for decontaminating groundwater using iron-based or other materials such as active metals, activated carbon, limestone, etc are disclosed in U.S. Pat. No. 6,254,786 to Carpenter et al. and U.S. Pat. No. 6,428,695 to Naftz et al.

While the ZVI wall and VLBs are capable of remediating groundwater, a need exists for a PRB capable of selectively removing metal ions such as cesium from contaminated groundwater. An ideal PRB would: (1) have a tunable water passing rate to approximate the hydraulic conductivity of the subsurface environment where the PRB is placed; (2) have sufficient mechanical strength, when wet and dry, to maintain barrier integrity; (3) have the ability to incorporate selective metal sequestration agents so that they remain active, yet do not leach from the barrier; and (4) be deployable through direct injection methods such that trenching is not needed. Additionally, there is a need to keep the technology as low cost as possible, while remaining reliable. The present invention, as described in more detail below, fulfills these needs.

The inventors fulfill the above mentioned needs by creating new nanocomposite materials that may be used to form PRBs of the present invention. Generally, type I nanocomposites have a preformed polymer constituent embedded in an inorganic constituent wherein the inorganic constituent is formed in situ from the condensation of an inorganic precursor in a mixture with the polymer constituent. Type I nanocomposites also lack significant covalent bonding between the preformed polymer constituent and inorganic constituent. Type I nanocomposites have been reported to be formed with a variety of organic preformed polymers and inorganic precursors. Namely, nanocomposites formed from preformed polymers such as polyacrylonitrile (PAN), polyethyleneoxide (PEO), polyethylene glycol (PEG), polyvinyl acetate (PVAc), polyvinyl alcohol (PVA) and tetraethylorthosilicate (TEOS) are known in the art to be formed from the condensation reaction of the TEOS in the presence of the solvated polymer. Such material systems form nanocomposites having a polymer constituent (PAN, PEO, PEG, PVA, or PVAc) forming an interpenetrating network with the silicon dioxide constituent. Other types of preformed polymers have been used with TEOS to form nanocomposites. The article *Organic/Inorganic Hybrid Network Materials by the Sol-Gel Approach*, Chem. Mater. 1996, 8, 1667–1681 by J. Wen and B. L. Wilkes provides a background on many types of nanocomposites that have been formulated.

BRIEF SUMMARY OF THE INVENTION

The present invention includes nanocomposite materials having a composition comprising an organic polymer constituent, an inorganic constituent, and a metal ion sequestration constituent. Methods for making nanocomposite materials are also disclosed. In accordance with the present invention, the nanocomposite materials may be configured for use in subsurface permeable reactive barriers (PRBs) for selectively removing metal ions from contaminated groundwater within an aquifer or for removing metal ion contaminants from contaminated groundwater within the vadose zone prior to the contaminants entering the aquifer.

In one aspect of the present invention, a nanocomposite material is disclosed having a composition comprising an inorganic constituent, a metal ion sequestration constituent, and an organic polymer constituent wherein the polymer constituent and the inorganic constituent form an interpenetrating network with each other. The nanocomposites of the present invention exhibit a single phase, substantially homogeneous structure in that the structure is characterized as being substantially free of detrimental phase separation of the polymer constituent and inorganic constituent. The inorganic constituent may be comprised of an inorganic oxide such as, for example, a silicon dioxide, aluminum oxide, titanium oxide, zirconium oxide, boron oxide, and combinations thereof formed in situ from the condensation reaction of an inorganic precursor with the solvated polymer constituent and metal ion sequestration constituent. The polymer constituent may be any suitable hydrophilic polymer capable of forming a type I nanocomposite such as, for example, polyacrylonitrile, polyethyleneoxide, polyethylene glycol, polyvinyl acetate, polyvinyl alcohol, and combinations thereof. The metal ion sequestration constituent may be ammonium molybdophosphate, phosphonopyridine n-oxides, thiophosphinic acid, dithiophosphinic acid, and combinations thereof. Furthermore, the metal ion sequestration constituent is capable of chemically binding with aqueous metal ions such as cesium. The nanocomposite materials of the present invention may be produced from the condensation reaction of an inorganic precursor in the presence of the solvated polymer constituent and the metal ion sequestration constituent.

In another aspect of the present invention, a permeable reactive barrier system is disclosed. The permeable reactive barrier system includes a membrane formed from nanocomposite materials of the present invention disposed in a flow path of contaminated groundwater. The membrane may be placed within the vadose zone of the ground or placed deeper, within the water table. In an exemplary embodiment, the membrane permeability closely matches the hydraulic conductivity of the soil it is placed in. In another exemplary embodiment, the membrane material may be directly injected into the ground. In another exemplary embodiment, the membrane may be placed into an excavated trench within the ground. In yet another exemplary embodiment, the permeable reactive barrier system may include substantially impermeable sidewalls placed within the ground for directing the flow of contaminated groundwater to the membrane.

In a further aspect of the present invention, a method of treating groundwater is disclosed. Groundwater having metal ion contaminants flows into a permeable material formed from nanocomposite materials of the present invention. The metal ion contaminants, such as cesium, present in the contaminated groundwater bind to the permeable material. The groundwater then flows out of the permeable material having a reduced amount of metal ion contaminants relative to the contaminated groundwater entering the permeable material.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
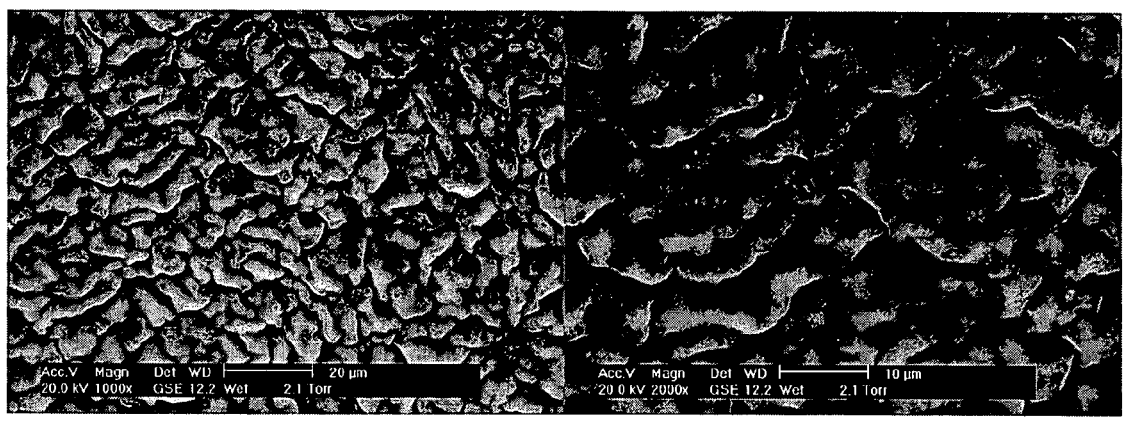
FIG. 1 is an photomicrograph of the nanocomposite material of Example 1 after subjecting it to aqueous swelling experiments.

The present invention includes nanocomposite materials having a composition comprising an organic polymer constituent, an inorganic constituent, and a metal ion sequestration constituent. Methods for making nanocomposite materials are also disclosed. In accordance with the present invention, the nanocomposite materials may be configured for use in subsurface permeable reactive barriers (PRBs) that selectively remove metal ions from contaminated groundwater.

Nanocomposite materials of the present invention have a composition including a metal ion sequestration constituent, an inorganic constituent, and a preformed organic polymer constituent forming an interpenetrating network with the inorganic constituent. Nanocomposite materials of the present invention are characterized as single phase, substantially homogenous materials in that they lack phase separation of the polymer constituent and the inorganic constituent. Phase separation, typically, leads to materials having little or no mechanical integrity. Instead, nanocomposites of the present invention are exemplified as having a type I nanocomposite structure such as the preformed polymer constituent being embedded in a network of the inorganic constituent or the preformed polymer constituent and the inorganic constituent forming an interpenetrating network with each other. In contrast, if a traditional "macroscale" composite were formed having a polymer constituent and an inorganic constituent, the composite would be characterized as a two phase composite material such as the inorganic constituent dispersed throughout a polymer constituent matrix with distinct phase separation between the two constituents. However, nanocomposites of the present invention are substantially homogeneous single phase materials wherein the polymer constituent and the inorganic constituent become an intractable interpenetrating network with each other at the molecular level upon formation of the nanocomposite. Furthermore, the inorganic constituent lacks significant covalent bonding with the organic polymer constituent in the formed nanocomposite material.

The percentage of the polymer constituent relative to the inorganic constituent in the formed nanocomposite may be controlled by altering the ratio of the inorganic precursor to the polymer constituent when synthesizing the nanocomposite. As the volume fraction of the inorganic constituent increases, the properties of the formed nanocomposite will be dominated by the inorganic constituent or vice versa.

The polymer constituent may be selected from any suitable hydrophilic polymer capable of forming a type I nanocomposite. Exemplary examples of such polymers include commercially available polymers such as polyacrylonitrile (PAN), polyethyleneoxide (PEO), polyethylene glycol (PEG), polyvinyl acetate (PVAc), polyvinyl alcohol (PVA), and combinations thereof.

The inorganic constituent may be an inorganic oxide. The term oxide, as used herein, embraces multiple oxides, inorganic glasses, ceramic materials, and mixtures thereof. Such oxides may be crystalline, amorphous, or partially crystalline and partially amorphous. Exemplary examples of such inorganic oxides include silicon dioxide, aluminum oxide, titanium oxide, zirconium oxide, boron oxide, and combinations thereof. The inorganic oxides forming the inorganic constituent of the nanocomposite may be formed in situ from the condensation of an inorganic precursor in a mixture with the polymer constituent and the metal ion sequestration constituent. Exemplary examples of inorganic precursors include metal alkoxides such as silicon alkoxides, titanium alkoxides, zirconium alkoxides, aluminum alkoxides, and combinations thereof. More specifically, exemplary precursors for the inorganic oxide constituent include tetraethylorthosilicate (TEOS), tetraisopropoxyorthotitanate, zirconium n-butoxide, aluminum tri-sec butoxide, and combinations thereof. For example if TEOS is used as the inorganic precursor, silicon dioxide is formed as the inorganic constituent.

The metal sequestration constituent may be selected from materials that are compatible with the inorganic constituent and the polymer constituent. Exemplary examples of metal ion sequestration constituents are ammonium molybdophosphate (AMP), phosphonopyridine n-oxides, thiophosphinic acid, dithiophosphinic acid, and combinations thereof. Desirable properties for the metal ion sequestration constituent are that it selectively binds metal contaminants, such as metal ions, and that the binding is substantially irreversible. Due to these binding properties, the metal ion sequestration constituent is capable of selectively removing specific metal ions from a solution such contaminated groundwater. For example, AMP may be used to sequester cesium metal ions. Furthermore, the metal sequestration constituent may be substantially uniformly distributed throughout the formed nanocomposite material.

The permeability of the nanocomposite may be controlled by choosing a polymer constituent with an appropriate permeability. Hydrophilic polymers such as PAN, PEO, PEG, PVA, and PVAc all absorb water to varying degrees. Since permeability is highly correlated with swelling behavior, the permeability of the nanocomposite may be tailored by a suitable choice of the polymer constituent and the percentage of the polymer constituent in the final nanocomposite material. For instance, a nanocomposite using a PVAc polymer constituent will have a permeability significantly less than a nanocomposite containing the more hydrophilic PVA polymer. Also, as the percentage of the inorganic constituent increases, the formed nanocomposite will be less water permeable causing a slower fluid flow rate through the nanocomposite. The resulting slower fluid flow rate through the nanocomposite results in longer contact times of the fluid with the nanocomposite, thus producing a greater capture efficiency by the metal ion sequestration constituent. Conversely, the permeability may be increased, and thus the fluid flow rate, by increasing the percentage of the polymer constituent in the nanocomposite. However, increasing the percentage of the polymer constituent causes the capture efficiency of the metal ion sequestration constituent to decrease due to lower contact times of the fluid flow with the nanocomposite.

Broadly described, the nanocomposites of the present invention may be formed from an appropriate amount of an inorganic precursor, a polymer constituent, and a metal ion sequestration constituent. First, an appropriate amount of solid polymer material may be dissolved in a solvent capable of dissolving the polymer material. If needed, the mixture may then be sonicated in a capped vial using an ultrasonic bath for a short time until all of the solid polymer material dissolves into the solution. Following sonication, an inorganic precursor may be added to the mixture and, if necessary, a catalyst. The mixture may be sealed in a capped vial and the sonication step repeated to fully dissolve the ceramic precursor into the solution. Following the step of dissolving the inorganic precursor, an appropriate amount of a metal ion sequestration constituent may be added to the solution and the solution subsequently sonicated. Next, the solution containing the polymer constituent, the inorganic precursor, and the metal ion sequestration constituent may be cast into moulds and covered to slow solvent release. The nanocomposites of the present invention self-assemble over various time frames depending on the exact formulation used. Additional heating may be conducted to remove all solvents and the organic portions of the ceramic precursors.

The nanocomposite materials of the present invention and methods for formulating such materials will be better understood with reference to the following examples and experimental results described below. The following examples are intended for purposes of illustration and are not to be construed as in any way limiting the scope of the present invention, which is defined in the claims appended hereto.

EXAMPLE 1

Nanocomposite materials of the present invention containing PVA as the polymer constituent and silicon dioxide as the inorganic constituent were formed as follows. A (50:50) weight to volume ratio was calculated for the PVA polymer and the liquid silicate precursor TEOS. Approximately 300 mg of polymer was dissolved into an acetic acid/nanopure water (NP) solvent system (80/20 acetic acid/NP, 10 mL). This mixture was then sonicated in a sealed 20 mL scintillation vial until completely dissolved. Then, a 360 μL aliquot of TEOS was added and the mixture was again capped and sonicated at 50° C. for 30 minutes. Weighed portions of AMP metal sequestration agent was added to each vial (25–400 mg). The solutions were then sonicated at 50° C. for 30 minutes. The solutions were then poured into Teflon® moulds and loosely covered to slow solvent release. The nanocomposites of Example 1 self-assembled over the course of 1–3 days depending on the exact nanocomposite formulation. The formed films were then carefully peeled from the Teflon® moulds and used for swelling and mechanical studies. Additional heating at 100° F. for 30 minutes was conducted to aid in removing lingering acetic acid fumes from the nanocomposite matrix. Care was taken to ensure that these thin, flexible films were not overly stressed during the removal from the casting moulds. Nanocomposite materials formed by the above method exhibit an interpenetrating network of the silicon dioxide constituent with the PVA polymer constituent. AMP was also uniformly dispersed throughout the nanocomposite.

Figure 2:
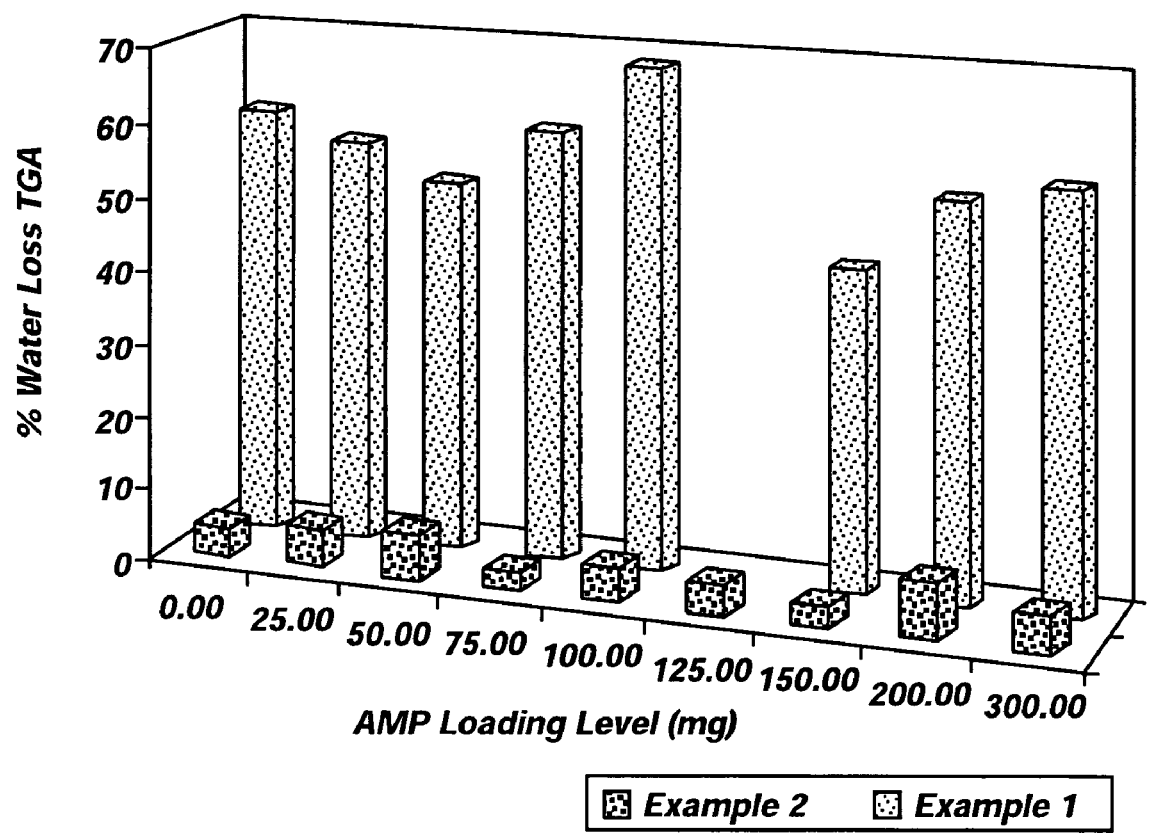
FIG. 2 is a graph showing amount of swelling of nanocomposite materials of Examples 1 and 2.

Samples of the nanocomposite material of Example 1 were subjected to aqueous swelling experiments. A Thermogravimetric Analyzer (TA Instruments, Model 2950, New Castle, Del.) was used to analyze various swollen nanocomposites in order to determine the percent swelling due to water up-take. Instrument parameters employed were: nitrogen as the furnace purge gas, 2 pt/sec sampling interval, with a temperature ramp starting at 30° C. and progressing at 10° C./min to a maximum of 200° C. Swelling data was determined by the weight loss at 100° C. Referring to FIG. 2, the PVA nanocomposites of Example 1 were found to swell between 56–67 weight percent water when subjected to swelling experiments by immersing samples in water.

While the nanocomposites of Example 1 swelled considerably, the PVA polymer constituent remained firmly locked within the nanocomposite as shown in scanning electron photomicrograph of FIG. 1. The lighter regions in FIG. 1 are regions that swelled due to water uptake. The darker regions in FIG. 1 are regions of higher silicon dioxide density resulting in less swelling. When the hydrophilic PVA polymer swells with water, the silicon dioxide constituent does not yield, keeping the nanocomposite structure of the material intact. Subsequently, when the nanocomposite dries out, the polymer constituent shrinks back to its original dimensions. Gravimetric leach tests subjecting the nanocomposites of Example 1 to repeated wet/dry cycles removed less than 1 to 2 percent of the PVA polymer from the nanocomposite further confirming that the PVA constituent remains firmly bonded within the nanocomposite.

Figure 3:
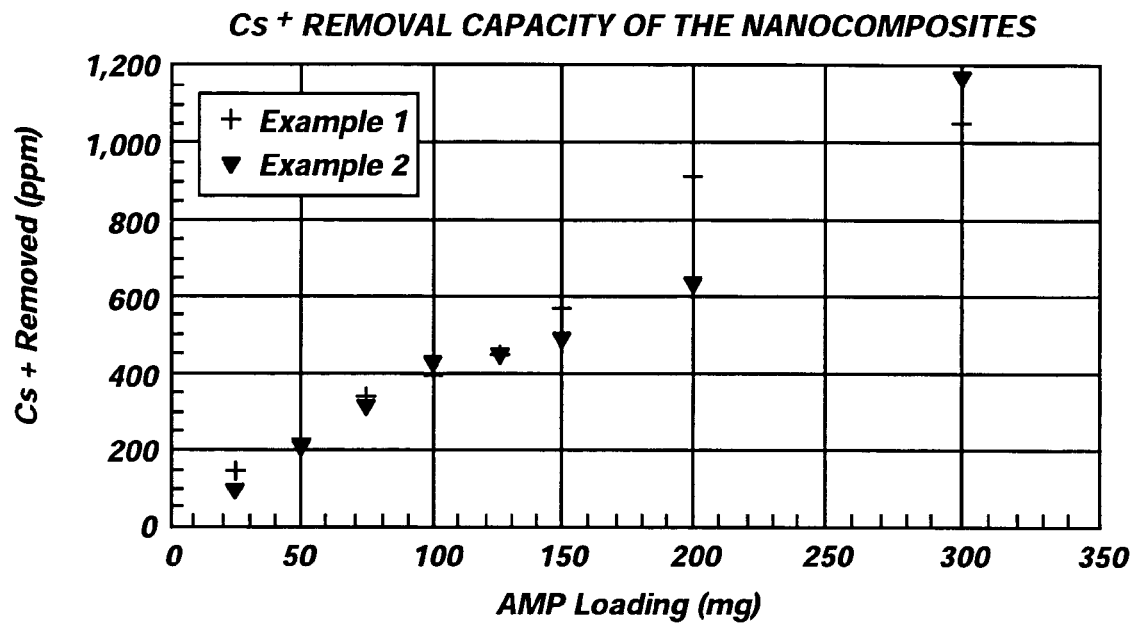
FIG. 3 is illustrates the results of cesium uptake studies for the nanocomposite materials of Example 1 and 2.

Cesium uptake studies were performed by immersing samples in a solution having a two-fold excess of cesium ions to determine if the AMP within the PVA nanocomposite of Example 1 was accessible to the bulk solution and could permanently sequester cesium within the nanocomposite material. For the total cesium uptake capacity results shown in FIG. 3 and efficiency results shown in FIG. 4, the nanocomposites of Example 1 were soaked in aqueous CsBr solution for 5 days in capped bottles at room temperature. In each case, the total initial concentration of $Cs^+$ was set at twice the maximum uptake capacity for the amount of AMP in each nanocomposite formulation. After this time, an aliquot of the solution was removed and analyzed by inductively coupled plasma mass spectrometer (ICP-MS) to determine the final cesium concentration. Referring to FIG.3, a roughly linear correlation between the amount of AMP incorporated into the nanocomposite and the quantity of cesium ions sequestered from the CsBr solution was observed.

Figure 4:
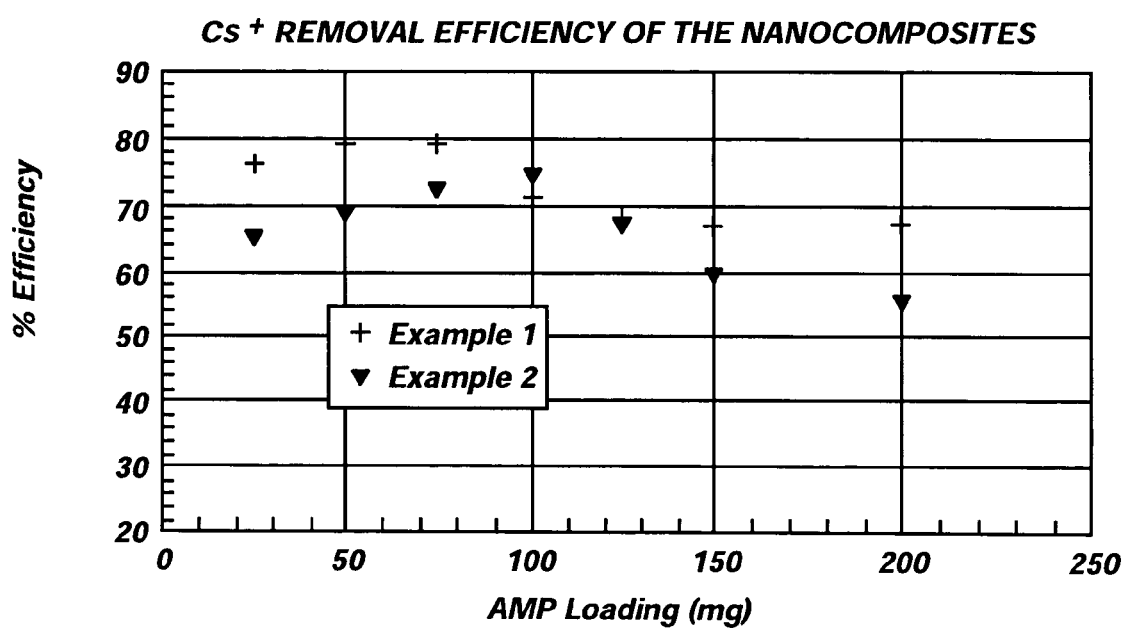
FIG. 4 illustrates the efficiency of cesium sequestration as a function of ammonium molybdophosphate concentration for the nanocomposite materials of Example 1 and 2.

FIG. 4 shows the efficiency of cesium sequestration as a function of AMP concentration within the PVA nanocomposites of Example 1. This percent efficiency is defined as the ratio of the amount of cesium irreversibly bound within the nanocomposite to the amount bound to AMP in free solution—the upper limit of sequestration for the experimental conditions of pH and temperature. The efficiency was determined to be between approximately 60% to 80%. It is currently believed by the inventors that nearly three fourths of the AMP is in a position within the nanocomposite where it is accessible to the cesium in the bulk solution, and it remains active as a cesium binding agent. Furthermore, the inventors currently believe that the remainder of the AMP must reside in a position within the nanocomposite such that it is either inaccessible to the bulk solution, or in such an environment where the agent is no longer active.

Leaching experiments were conducted to determine to what extent the cesium sequestered within the PVA nanocomposite was irreversibly bound. PVA nanocomposites saturated with cesium ions were briefly rinsed in NP water and then soaked in fresh NP water for five days. After the five days, aliquots of the soak solution were analyzed for cesium concentration. The amount of cesium that was leached from the material was quantified by using an ICP-MS. The results of this analysis are reported in Table 1. The PVA nanocomposite of Example 1 exhibits a very high ratio of irreversibly bound to reversibly bound cesium. All values were well in excess of 99% irreversibly bound cesium. It is currently believed by the inventors that the AMP is interacting with the cesium ions within the nanocomposite in a manner similar to interactions that occur in free solution.

The scavenging ability of the PVA nanocomposites of Example 1 was investigated. The PVA nanocomposites of Example 1 were immersed in a CsBr solution containing cesium ions at one half of the experimentally determined capacity for each material. After 5 days of soak time in capped bottles at room temperature, the solutions were assayed for residual cesium using ICP-MS. In all cases, very little cesium was found. Typical concentrations were 1–3 parts per million (ppm) for the PVA systems. The PVA nanocomposites of Example 1 are able to efficiently scavenge essentially all of the cesium from solution. The residual concentrations found were a result of a minor amount of cesium leaching from the nanocomposites as observed in the capacity experiments.

The results shown in FIG. 3, FIG. 4, and Table 1 were obtained using a VG/FISONS Plasma Quad inductively coupled plasma mass spectrometer (ICP-MS). The instrument was calibrated and operated in accordance with manufacture's instructions. The range of the calibration for the analysis was 0–400 ng/mL. The calibration was verified using Quality Assurance\Quality Control (QA\QC) standards, which included a continuing calibration verification standard (CCV) and a continuing calibration blank (CCB). The QA\QC standards were analyzed at regular intervals throughout the analysis. Both the calibration and QA\QC standards were prepared from certified reference solutions, which adhere to second source requirements, and were traceable to NIST.

Samples were prepared for analysis in the ICP-MS by cutting the nanocomposite materials into small pieces and placing them into 20 mL scintillation vials containing an aqueous solution containing a known amount of cesium. After soaking for specified times while sealed, sample aliquots were taken from each vial and subjected to ICP-MS analysis for cesium and molybdenum. Each of the samples required a dilution to bring them into the calibration range of the procedure. Sample dilutions were made using NP along with nitric acid and an internal standard. At least one sample was spiked with a known concentration of the analyte and a recovery was calculated to verify the accuracy of the procedure.

Various samples of Example 1 were tested on a Dynamic Mechanical Analyzer (TA Instruments, Model 2980, New Castle, Del.) fitted with a Tension (film) clamp. The instrument method developed for tension measurements consisted of the establishment of a 0.01 Newton (N) static force and a linear ramp rate of 0.5 N/min up to 18 Newtons, or to the limit of travel (24.7 mm), or until the sample yielded. The nanocomposites of Example 1 were then subjected to a series of isothermal experiments surrounding the nanocomposite glass transition temperatures (10–90° C.). Test materials were obtained by heating the nanocomposite of Example 1 above its glass transition temperature in order to obtain non-stressed, punched samples. The membrane specimens were cut with a laboratory fixture consisting of two razor blades mounted on a parallel plate yielding a 6.20-mm by 39.0-mm test specimens which were measured with a caliper (Mitutoyo, Model ID-C112EBS, Japan) in several places along the length to obtain an average membrane thickness. In addition to ultimate yield strength, the length of the specimen elongation, storage modulus, loss modulus, and tan delta of these nanocomposites were also recorded. This data was acquired with the following parameters: 0.01 N static force applied to the sample; 10 μm amplitude; constant 50 Hz frequency; auto strain 125%; sampling rate 2 pt/sec; temperature ramp of −80 to 200° C. in multifrequency mode.

Figure 5A:
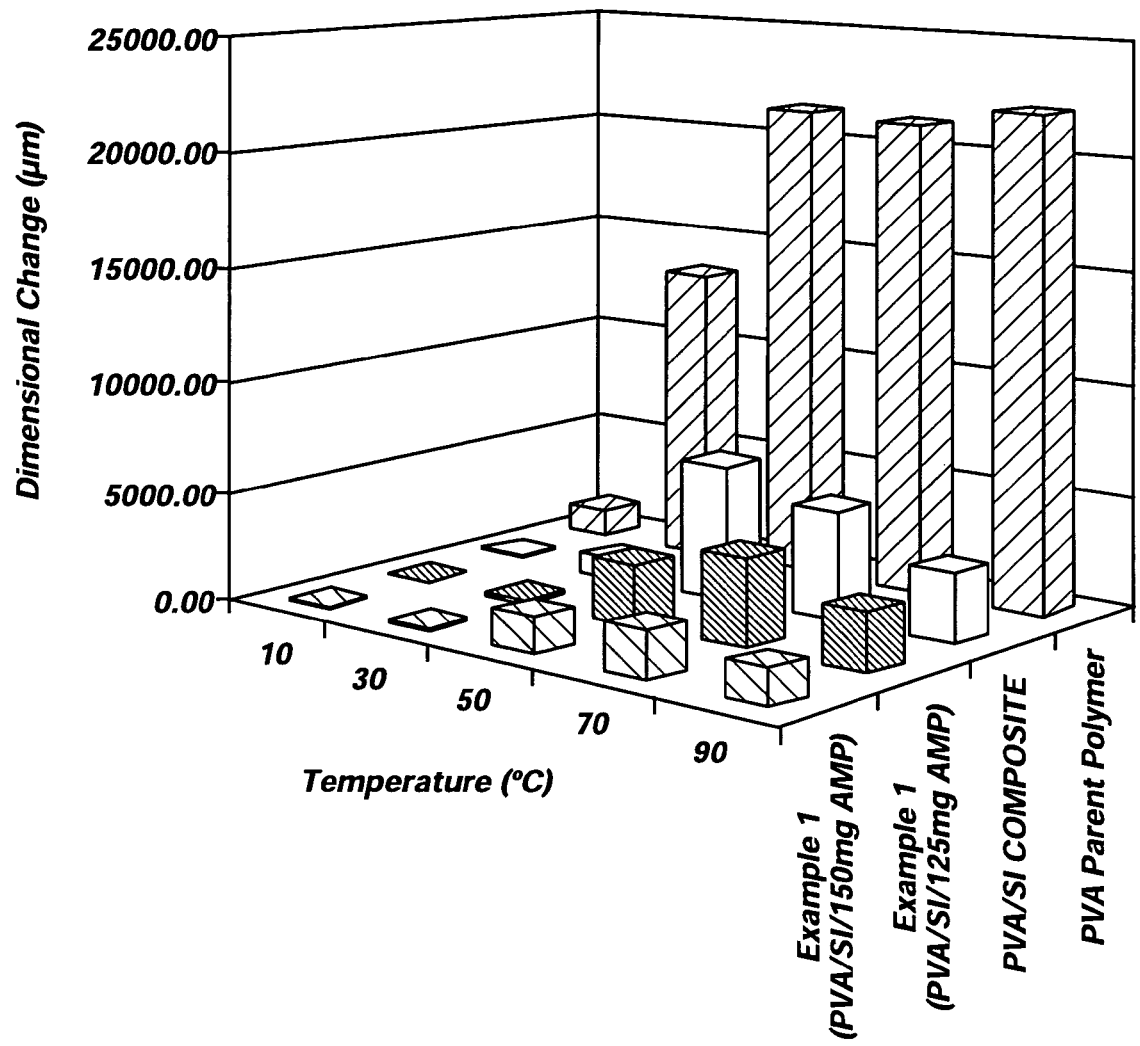
FIGS. 5A and 5B illustrate some of the exemplary mechanical properties of the nanocomposite material of Example 1.
Figure 5B:
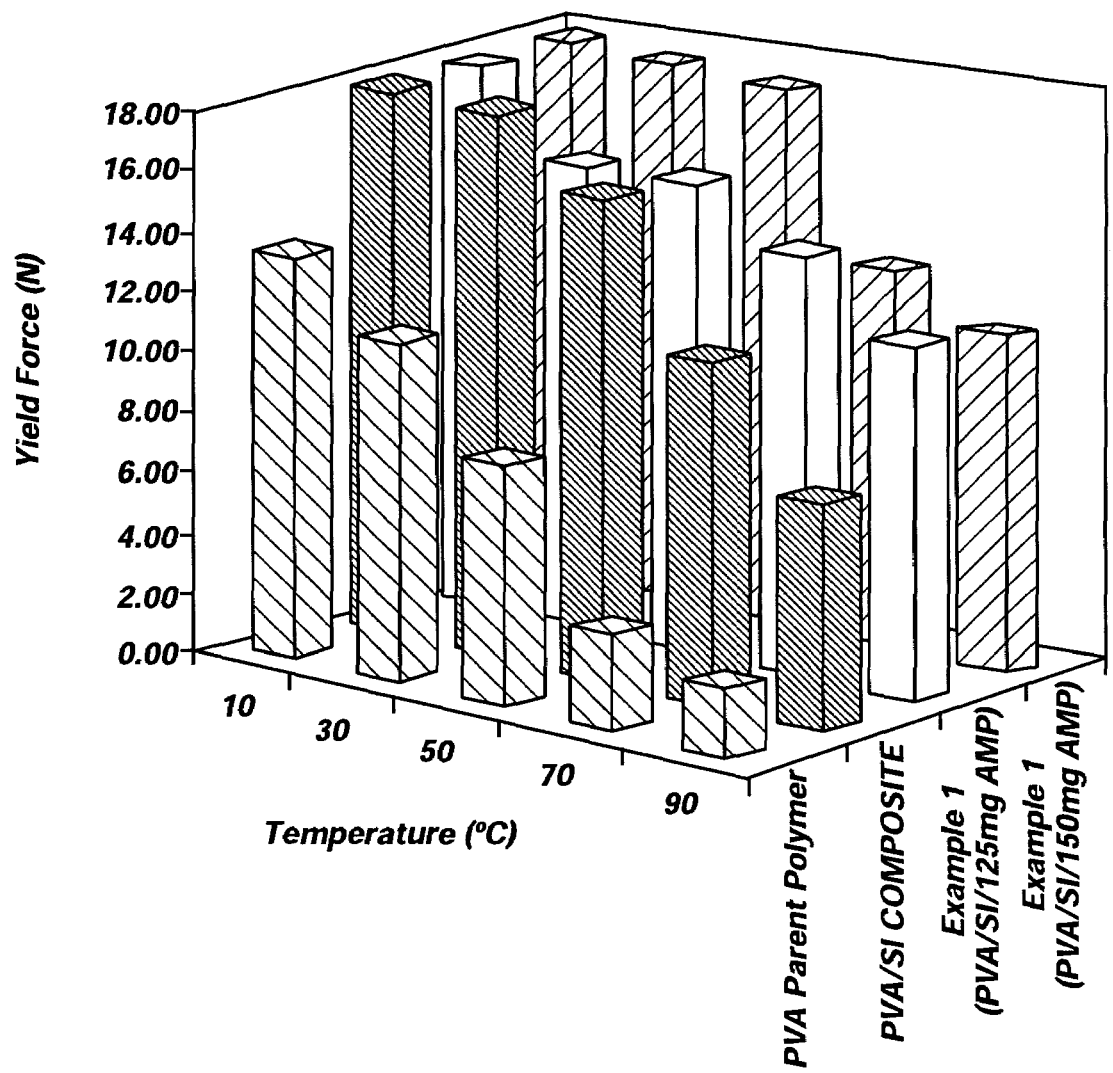

FIGS. 5A and 5B show some of the exemplary mechanical properties of the nanocomposites of Example 1 obtained from the Dynamic Mechanical Analyzer experiments. FIG. 5A illustrates the dimensional change (elongation) while under stress at various temperatures for Example 1, a PVA/silicon dioxide sample without AMP, and PVA. FIG. 5B illustrates the yielding force versus temperature for Example 1, a PVA/silicon dioxide sample without AMP, and PVA.

TABLE 1

Cesium leaching after sequestration from nanocomposite materials of Example 1

| Experiment # | AMP (mg) | Leach (ppm Cs+) | % $Cs^+$ Irreversibly Bound |
|---|---|---|---|
| 1 | 50 | 0.40 | 99.82 |
| 2 | 100 | 1.17 | 99.71 |
| 3 | 125 | 2.03 | 99.55 |
| 4 | 150 | 1.60 | 99.72 |
| 5 | 200 | 6.00 | 99.34 |
| 6 | 300 | 4.10 | 99.61 |

EXAMPLE 2

Nanocomposite materials of Example 2 were prepared in an identical manner as Example 1, except PVAc was used as the polymer constituent. Nanocomposite materials formed in Example 2 exhibit an interpenetrating network of the silicon dioxide constituent with the PVAc polymer constituent. AMP was also uniformly dispersed throughout the nanocomposite.

Samples of the nanocomposite material of Example 2 were subjected to aqueous swelling experiments in the same manner performed on samples of Example 1. While the nanocomposites of Example 2 swelled considerably, the PVAc polymer constituent remained locked within the nanocomposite. Gravimetric leach tests subjecting Example 2 to repeated wet/dry cycles, in which less than 1 to 2 percent of the PVAc polymer was removed from the nanocomposite further confirmed that the PVAc constituent remains firmly locked within the nanocomposite. With reference to FIG. 2, PVAc nanocomposites of Example 2 were only observed to take up between 3–7 weight percent water.

Cesium uptake studies were performed by immersing samples in a solution having a two-fold excess of cesium ions to determine if the AMP within the PVAc nanocomposite of Example 2 was accessible to the bulk solution and could permanently sequester cesium within the nanocomposite material. The cesium uptake experiments were performed in the same manner as used on samples of Example 1. Referring to FIG. 3, a roughly linear correlation between the amount of AMP incorporated into the nanocomposite and the quantity of cesium ions sequestered was observed.

Cesium sequestration experiments were performed on the nanocomposites of Example 2 in an identical manner as performed on samples Example 1. FIG. 4 shows the efficiency of cesium sequestration as a function of AMP concentration within the PVAc nanocomposites of Example 2. The cesium sequestration efficiency was found to be very similar in behavior and effectiveness to that of example 1.

Leaching experiments were conducted to determine to what extent the cesium sequestered within the PVAc nanocomposites of Example 2 were irreversibly bound. The experiments were performed in the same manner as used on samples of Example 1. PVAc nanocomposite of Example 2 saturated with cesium ions were also soaked in NP water and the amount of cesium that was leached from the material was quantified by ICP-MS analyses. The results of these analyses are reported in Table 2. The PVAc nanocomposite of Example 2 also exhibits a very high ratio of irreversibly bound to reversibly bound cesium. All values were well in excess of 99% irreversibly bound cesium. The PVAc nanocomposites of Example 2 exhibit less leaching of the cesium ion than the PVA nanocomposites of example 1. It is currently believed by the inventors that size restrictions are likely important phenomena for the functioning of the material. When PVA, a more hydrophilic polymer than PVAc, is used as the polymer constituent in the system the nanocomposites are swollen to a greater extent at equilibrium with an aqueous environment than observed in the PVAc systems. This greater degree of swelling results in a more "open" matrix for PVA systems and thus more opportunities for a "pathway" through the matrix of sufficient size to allow for the exit migration of both cesium and AMP.

The scavenging ability of the PVAc nanocomposites of Example 2 was also investigated using the same experimental technique used on samples of Example 1. The PVAc nanocomposites of Example 2 were immersed in a solution containing cesium ions at one half of the experimentally determined capacity for each material. After 5 days of soak time, the solutions were assayed for residual cesium using ICP-MS. In all cases, only about 100–300 parts per billion (ppb) cesium was found in the assayed solution. The PVAc nanocomposites of Example 2 are able to efficiently scavenge essentially all of the cesium and the residual concentrations found result from slight cesium leaching from the nanocomposites as observed in the capacity experiments.

The results shown in FIG. 3, FIG. 4, and Table 2 for Example 2 were obtained using ICP-MS analysis in the same manner as performed on samples of Example 1 set forth in more detail above.

TABLE 2

Cesium leaching after sequestration from nanocomposite materials of Example 2

| Experiment # | AMP (mg) | Leach (ppm Cs+) | % $Cs^+$ Irreversibly Bound |
|---|---|---|---|
| 1 | 25 | 0.10 | 99.89 |
| 2 | 50 | 0.19 | 99.90 |
| 3 | 75 | 0.24 | 99.76 |
| 4 | 100 | 0.30 | 99.93 |
| 5 | 125 | 0.25 | 99.94 |
| 6 | 150 | 0.27 | 99.94 |
| 7 | 200 | 0.24 | 99.96 |
| 8 | 300 | 0.29 | 99.97 |

EXAMPLE 3

Nanocomposite materials of the present invention containing PAN as the polymer constituent may be formed as follows. 300 mg of PAN polymer is dissolved into 10 mL of a 50/50 by volume tetrahydrofuran (THF)/ethanol mixed solvent in a capped vial. TEOS (336 mg) is added to this solution. A catalyst, typically HCl or KF, is then introduced as an aqueous solution (150 μL, 10–50 mM) and the mixture is capped and sonicated at 50° C. for 30 minutes. A weighed portion of AMP metal sequestration agent of the amount 25–400 mg is added to the vial. The solution is then sonicated at 50° C. for 30 minutes. The solution is aged from 1–12 hours (depending upon the catalyst used) in a sealed vial and poured into a Teflon® mold and loosely covered at room temperature. The nanocomposite material of Example 3 self assembles as the volatile solvent slowly escapes during the condensation process. Nanocomposite materials formed by the above method exhibit an interpenetrating network of the silicon dioxide constituent with the PAN polymer constituent. AMP is also uniformly dispersed throughout the nanocomposite.

EXAMPLE 4

The nanocomposite materials of Example 4 are prepared in an identical manner as Example 3, except PEO is used as the polymer constituent. Nanocomposite materials formed in Example 4 exhibit an interpenetrating network of the silicon dioxide constituent with a PEO polymer constituent. AMP is also uniformly dispersed throughout the nanocomposite.

EXAMPLE 5

The nanocomposite materials of Example 5 are prepared in an identical manner as Example 3, except PEG is used as the polymer constituent. Nanocomposite materials formed in Example 5 exhibit an interpenetrating network of the silicon dioxide constituent with the PEG polymer constituent. AMP is also uniformly dispersed throughout the nanocomposite.

Figure 6:
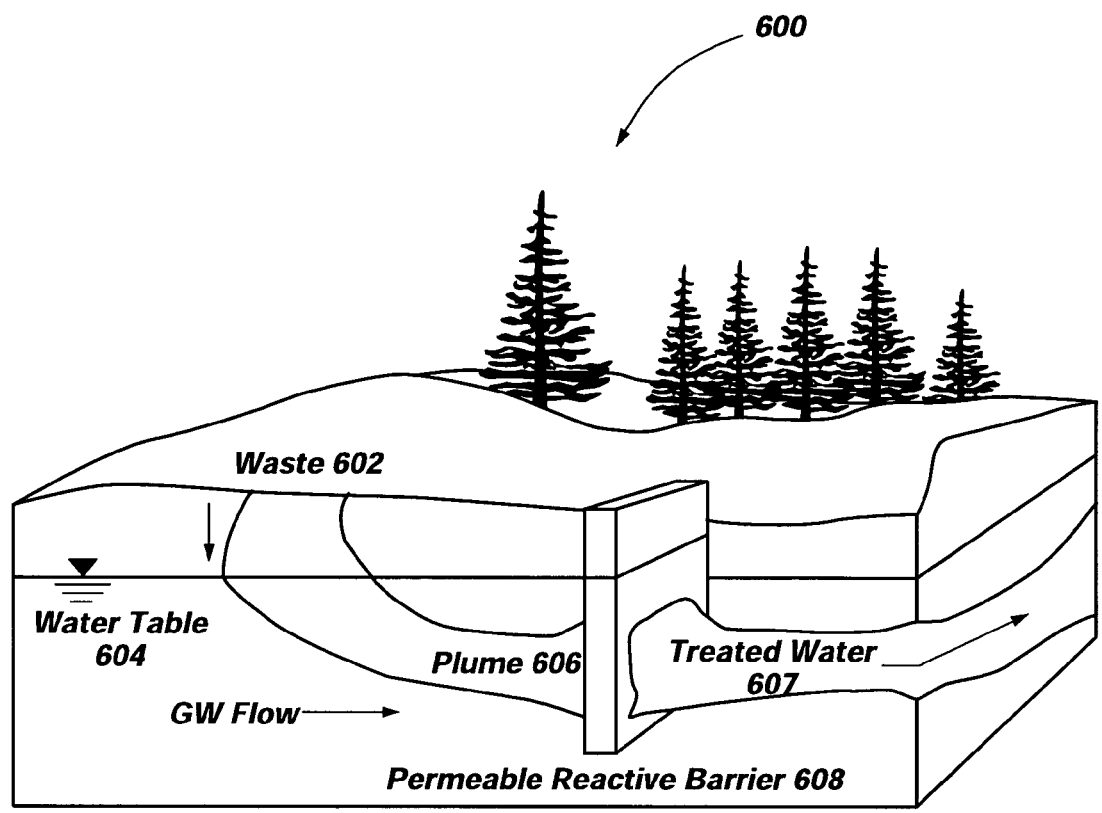
FIG. 6 illustrates the use of the nanocomposite materials of the present invention to remediate contaminated groundwater.

The nanocomposite materials of the present invention may be used as permeable reactive barriers (PRBs) to remediate contaminated groundwater. Referring to FIG. 6, an illustration of groundwater remediation system 600 using PRBs to remediate contaminated groundwater is shown. Waste 602 from a contamination source contaminates water table 604. Plume 606 of contaminated groundwater moves in the direction of PRB 608 formed from a nanocomposite material of the present invention. PRB 608 remediates plume 606 by selectively removing contaminants from plume 606. For example, if PRB 608 is formed from nanocomposite materials of any of Examples 1–5, cesium metal ions may be removed from plume 606. In an exemplary embodiment, the permeability of PRB 608 may be tailored to substantially match the hydraulic conductivity of the soil that it is embedded in. Tailoring the permeability of PRB 608 allows water and common ions to move freely through PRB 608 without disruption of the normal hydraulic flow of the groundwater, while selectively capturing and retaining specific metal ion contaminants found in the groundwater. After plume 606 travels across and through PRB 608, treated water 607 is produced having a reduced amount of contaminants relative to plume 606.

Figure 7:
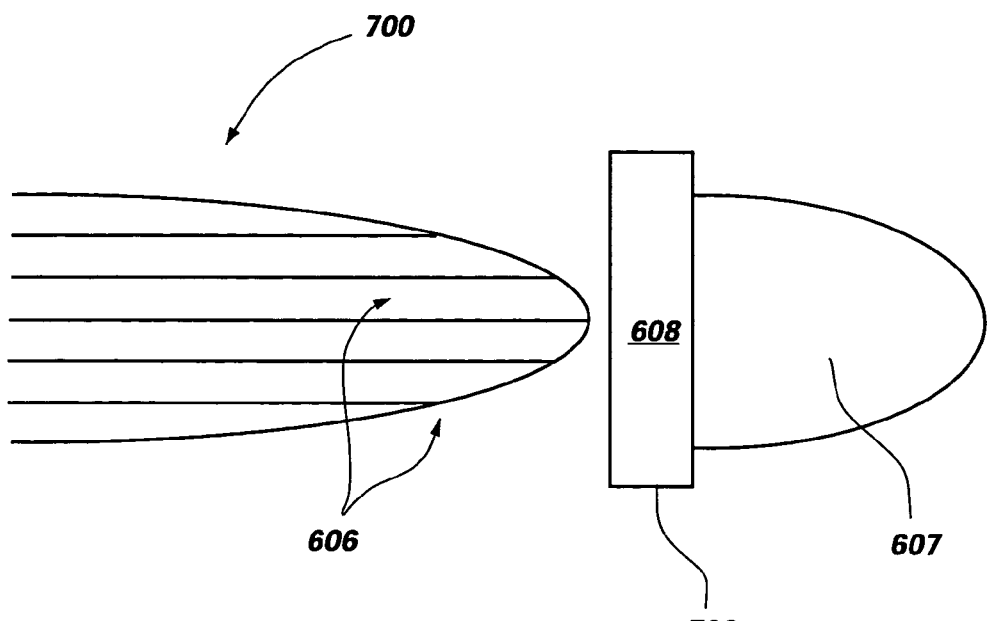
FIG. 7 illustrates a sectional view of a permeable reactive barrier system used with a permeable reactive barrier formed from nanocomposite materials of the present invention.

Referring to FIG. 7, an exemplary embodiment of a groundwater remediation system is shown. FIG. 7 shows a cross-sectional view looking down through the ground of PRB system 700. In this embodiment, continuous trench 702 may be excavated in the ground through the water table enabling access to the natural groundwater flow. PRB 608 may fill and be inserted in trench 702. PRB 608 may be inserted into trench 702 by grinding a fully cured nanocomposite material of the present invention into coarse bits that are subsequently slurried in water.

Representative sizes for the coarse bits of the nanocomposite may be approximately +20 mesh through −400 mesh. The slurried solution is then injected into trench 702 forming PRB 608. In another exemplary embodiment, trench 702 is not needed and the slurry of ground nanocomposite material may be directly injected into the ground to form PRB 608. The permeability of PRB 608 may be tailored to closely match the hydraulic conductivity of the ground it is placed within. Tailoring the permeability of PRB 608 allows water and common ions to move freely through PRB 608 without disruption of the normal hydraulic flow of the groundwater, while selectively capturing and retaining specific metal ion contaminants found in the groundwater. PRB 608 located within the ground may be located and positioned such that it is in the way of the naturally flowing plume 606 of the contaminated groundwater. After plume 606 of the contaminated groundwater passes through PRB 608, PRB 608 selectively removes desired metal ion contaminants. A substantial portion of the metal ion contaminants react with the PRB 608 and remain bound to PRB 608. Thus, treated water 607 exiting PRB 608 possesses substantially less contaminants than plume 606 that entered PRB 608.

Figure 8:
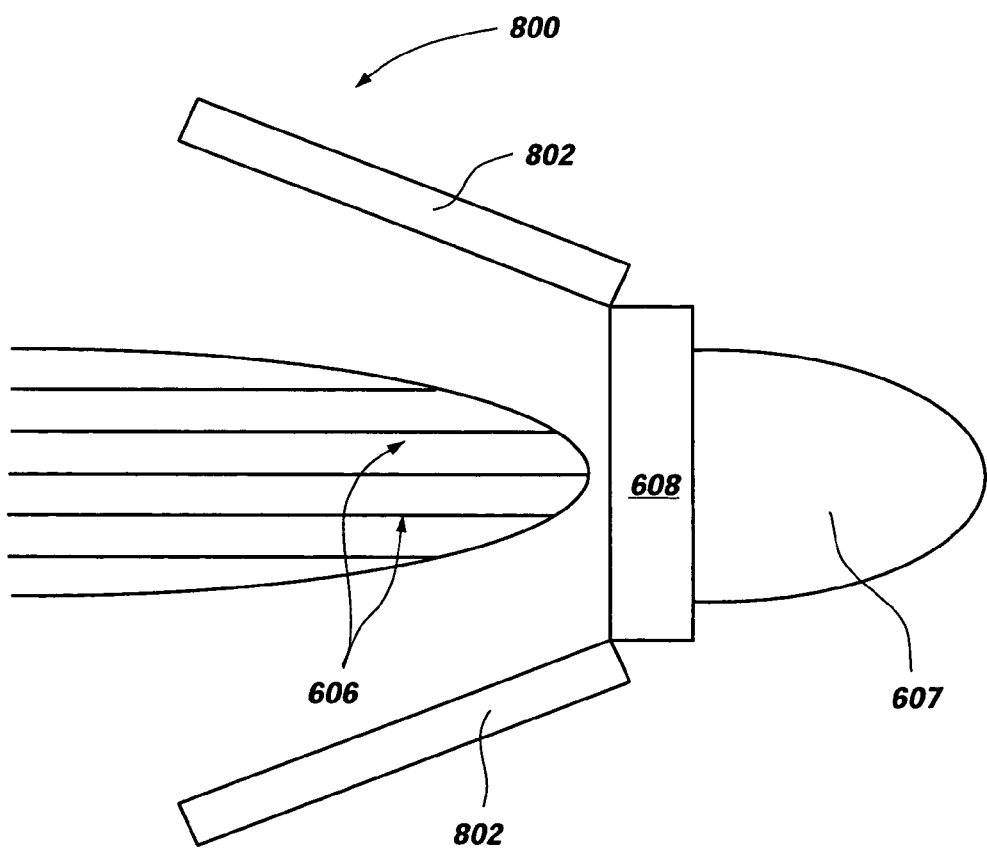
FIG. 8 illustrates a sectional view of a funnel and gate permeable reactive barrier system used with a permeable reactive barrier formed from nanocomposite materials of the present invention.

Referring to FIG. 8, an exemplary embodiment of a groundwater remediation system is shown using the so-called "funnel and gate system" PRB. FIG. 8 shows a cross-sectional view looking down through the ground of funnel and gate PRB system 890. The funnel and gate system PRB is similar in operation to the system shown in FIG. 7. PRB 608 may be placed in the ground as performed in the previous embodiments by way of trenching or direct injection. As with the previous embodiments, the permeability of PRB 608 may be tailored to closely match the hydraulic conductivity of the ground it is placed within. In the funnel and gate system, funnel walls substantially impermeable to groundwater are disposed in excavated trenches or directly injected into the ground. The substantially impermeable funnel walls direct the contaminated groundwater to PRB 608. Referring to FIG. 8, plume 606 may be directed by impermeable funnel walls 802 through PRB 608. Impermeable funnel walls 802 are positioned at an angle greater than zero degrees in relation to PRB 608. Impermeable funnel walls 802 may be constructed from slurry walls that are disposed in excavated trenches or directly injected into the ground. For example, a soil-bentonite mixture is one of the more common types of materials that may be used for impermeable funnel walls 802. Cement-bentonite slurry walls and composite barrier walls may also be used for impermeable funnel walls 802. Other materials useful for impermeable funnel walls 802 will be apparent to those of ordinary skill in the art. As with the previous embodiments, a substantial portion of the metal ion contaminants in plume 606 react with the PRB 608 and remain bound to PRB 608. Thus, treated water 607 exiting PRB 608 possesses substantially less contaminants than plume 606 that entered PRB 608.

Figure 9:
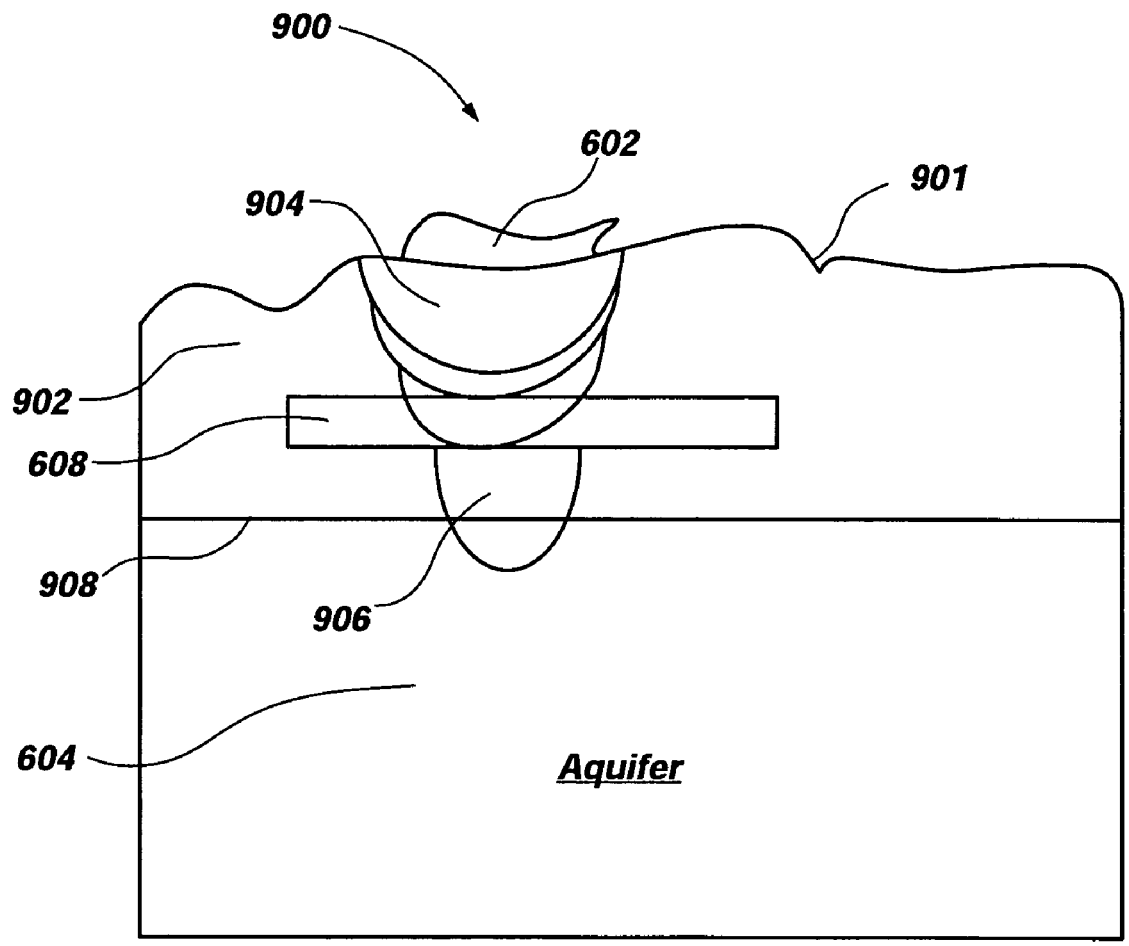
FIG. 9 illustrates a sectional view of a permeable reactive barrier system placed within the vadose zone of the ground.

Referring to FIG. 9, a sectional view of yet another exemplary embodiment of a groundwater remediation system is shown. Groundwater remediation system 900 removes metal ion contaminants from the vadose zone before the metal ion contaminants reach the water table. Waste 602 from a contamination source percolates through land surface 901 as plume 904. PRB 608, formed from a nanocomposite material of the present invention, may be placed within vadose zone 902 of the ground. The vadose zone is the region between the land surface and the water table 604 having vadose zone/water table border 908. While vadose zone 902 is commonly unsaturated, it contains enough moisture to exhibit a plume 904 that travels toward water table 604.

Again with reference to FIG. 9, PRB 608 may be placed within the ground by way trenching or direct injection. In exemplary embodiment, PRB 608 may be directly injected into the ground without the need for excavating a trench. Direct injection of PRB 608 may be effected by various methods depending on the type of soil that it will be injected into. For example, for a slow flow soil like clays, a solution containing the polymer, the inorganic precursor, the metal ion sequestration constituent, and, if necessary, a catalyst are injected into the ground as a liquid. The liquid subsequently naturally cures in the subsurface forming PRB 608 made from a nanocomposite of the present invention. For fast flow soils like sand, a fully cured nanocomposite of the present invention is first formed. Next, the nanocomposite is ground to coarse bits and slurried into water. Representative sizes for the coarse bits of the nanocomposite may be approximately +20 mesh through −400 mesh. This slurry is then injected into the ground to form PRB 608. Contaminant sequestration experiments on both types of direct injection of PRB 608 showed no significant difference in metal ion contaminant sequestration performance.

Again with reference to FIG. 9, as plume 904 within vadose zone 902 travels through PRB 608, PRB 608 selectively removes contaminants from plume 904 as effected in the previous embodiments. As in the previous embodiments, the permeability of PRB 608 may be tailored to substantially match the hydraulic conductivity of the soil that it is embedded in. Tailoring the permeability of PRB 608 allows water and common ions to move freely through PRB 608 without disruption of the normal hydraulic flow of the groundwater, while selectively capturing and retaining specific metal ion contaminants found in the groundwater. After plume 904 travels across and through PRB 608, treated water 906 is produced having a reduced amount of contaminants relative to plume 904. By placing PRB 608 as a passive barrier within the vadose zone, the aquifer of water table 604 is prevented from becoming contaminated by waste 602.

Although the foregoing description of embodiments and test data contains many specifics, these should not be construed as limiting the scope of the present invention, but merely as providing illustrations of some exemplary embodiments. Similarly, other embodiments of the invention may be devised which do not depart from the spirit or scope of the present invention. The scope of the invention is, therefore, indicated and limited only by the appended claims and their legal equivalents, rather than by the foregoing description. All additions, deletions, and modifications to the present invention, as disclosed herein, which fall within the meaning and scope of the claims are embraced thereby.

What is claimed is:

1. A substantially homogeneous nanocomposite material, comprising:
   an inorganic oxide constituent;
   a hydrophilic polymer constituent, the polymer constituent and the inorganic oxide constituent forming an interpenetrating network, a concentration of the hydrophilic polymer constituent in the nanocomposite material configured to impart a predetermined water permeability to the nanocomposite material; and
   a metal ion sequestration constituent substantially uniformly distributed through the interpenetrating network.

2. The nanocomposite material of claim 1, wherein the inorganic oxide constituent is a metal oxide.

3. The nanocomposite material of claim 1, wherein the inorganic oxide constituent is selected from the group consisting of silicon dioxide, aluminum oxide, titanium oxide, zirconium oxide, boron oxide, and combinations thereof.

4. The nanocomposite material of claim 1, wherein the metal ion sequestration constituent is formulated for chemically binding with cesium metal ions.

5. The nanocomposite material of claim 1, wherein the metal ion sequestration constituent is selected from the group consisting of ammonium molybdophosphate, phosphonopyridine n-oxides, thiophosphinic acid, dithiophosphinic acid, and combinations thereof.

6. The nanocomposite material of claim 1, wherein the inorganic oxide constituent is selected from the group consisting of silicon dioxide, aluminum oxide, titanium oxide, zirconium oxide, boron oxide, and combinations thereof; and wherein the metal ion sequestration constituent is selected from the group consisting of ammonium molybdophosphate, phosphonopyridine n-oxides, thiophosphinic acid, dithiophosphinic acid, and combinations thereof.

7. A method of making a nanocomposite material comprising:
   providing a mixture of a solvated hydrophilic polymer and an inorganic precursor;
   tailoring the concentration of the hydrophilic polymer in the mixture to impart a predetermined water permeability to a nanocomposite material to be formed from the mixture;
   adding a metal ion sequestration constituent to the mixture; and
   forming the mixture of the solvated hydrophilic polymer, the inorganic precursor, and the metal ion sequestration constituent into the nanocomposite material.

8. The method according to claim 7, further comprising selecting the inorganic precursor to be metal alkoxide.

9. The method according to claim 8 further comprising selecting the inorganic precursor from the group consisting of silicon alkoxides, titanium alkoxides, zirconium alkoxides, aluminum alkoxides, and combinations thereof.

10. The method according to claim 8, further comprising selecting the metal alkoxide from the group consisting of tetraethylorthosilicate, tetraisopropoxyorthotitanate, zirconium n-butoxide, aluminum tri-sec butoxide, and combinations thereof.

11. The method according to claim 7, further comprising selecting the metal ion sequestration constituent from the group consisting of ammonium molybdophosphate, phosphonopyridine n-oxides, thiophosphinic acid, dithiophosphinic acid, and combinations thereof.

12. The method according to claim 7, further comprising selecting the hydrophilic polymer from the group consisting of polyacrylonitrile, polyethyleneoxide, polyethylene glycol, polyvinyl acetate, polyvinyl alcohol, and combinations thereof.

13. The method according to claim 7, further comprising selecting the inorganic precursor from the group consisting of silicon alkoxides, titanium alkoxides, zirconium alkoxides, aluminum alkoxides, and combinations thereof;

selecting the hydrophilic polymer from the group consisting of polyacrylonitrile, polyethyleneoxide, polyethylene glycol, polyvinyl acetate, polyvinyl alcohol, and combinations thereof; and selecting the metal ion sequestration constituent from the group consisting of ammonium molybdophosphate, phosphonopyridine n-oxides, thiophosphinic acid, dithiophosphinic acid, and combinations thereof.

14. A permeable reactive barrier system comprising:
a membrane disposed in a flow path of water within the ground, the membrane formed from a substantially homogeneous nanocomposite material comprising:
an inorganic oxide constituent;
a hydrophilic polymer constituent, the polymer constituent and the inorganic oxide constituent forming an interpenetrating network, a concentration of the hydrophilic polymer constituent in the nanocomposite material configured to impart a water permeability to the membrane relative to a hydraulic conductivity of soil in which the membrane is disposed; and
a metal ion sequestration constituent substantially uniformly distributed through the interpenetrating network.

15. The permeable reactive barrier system of claim 14, wherein the inorganic oxide constituent is a metal oxide.

16. The permeable reactive barrier system of claim 14, wherein the inorganic oxide constituent is selected from the group consisting of silicon dioxide, aluminum oxide, titanium oxide, zirconium oxide, boron oxide, and combinations thereof.

17. The permeable reactive barrier system of claim 14, wherein the metal ion sequestration constituent is formulated for chemically binding with cesium metal ions.

18. The permeable reactive barrier system of claim 14, wherein the metal ion sequestration constituent is selected from the group consisting of ammonium molybdophosphate, phosphonopyridine n-oxides, thiophosphinic acid, dithiophosphinic acid, and combinations thereof.

19. The permeable reactive barrier system of claim 14, wherein the membrane is disposed within a vadose region of the ground.

20. The permeable reactive barrier system of claim 14, wherein the membrane is disposed in an excavated trench within the ground.

21. The permeable reactive barrier system of claim 20, wherein the membrane is disposed in a portion of the water table within the ground.

22. The permeable reactive barrier system of claim 14, further comprising substantially impermeable walls positioned and located within the ground to direct flow of groundwater toward the membrane.

23. The permeable reactive barrier system of claim 22, wherein the substantially impermeable walls are disposed at an angle greater than zero degrees in relation to the membrane.

24. The permeable reactive barrier system of claim 22, wherein the substantially impermeable walls are disposed in a portion of the water table.

25. The permeable reactive barrier system of claim 14, wherein the membrane exhibits a permeability substantially the same as a hydraulic conductivity of the ground the membrane is placed within.

26. The permeable reactive barrier system of claim 14, wherein the inorganic oxide constituent is selected from the group consisting of silicon dioxide, aluminum oxide, titanium oxide, zirconium oxide, boron oxide, and combinations thereof; and wherein the metal ion sequestration constituent is selected from the group consisting of ammonium molybdophosphate, phosphonopyridine n-oxides, thiophosphinic acid, dithiophosphinic acid, and combinations thereof.

27. The permeable reactive barrier system of claim 14, wherein the membrane comprises a plurality of discrete particles of the nanocomposite material.

28. A method of making a permeable reactive barrier system comprising:
providing a membrane formed from a substantially homogeneous nanocomposite material, the nanocomposite material comprising:
an inorganic oxide constituent;
a hydrophilic polymer constituent, the polymer constituent and the inorganic oxide constituent forming an interpenetrating network, a concentration of the hydrophilic polymer constituent in the nanocomposite material configured to impart a water permeability to the membrane relative to a hydraulic conductivity of soil in which the membrane is disposed; and
a metal ion sequestration constituent substantially uniformly distributed through the interpenetrating network; and
disposing the membrane within the ground and in a flow path of water within the ground.

29. The method according to claim 28, further comprising selecting the inorganic oxide constituent to be a metal oxide.

30. The method according to claim 28, further comprising selecting the inorganic oxide constituent from the group consisting of silicon dioxide, aluminum oxide, titanium oxide, zirconium oxide, boron oxide, and combinations thereof.

31. The method according to claim 28, further comprising formulating the metal ion sequestration constituent for chemically binding with cesium metal ions.

32. The method according to claim 28, further comprising selecting the metal ion sequestration constituent from the group consisting of ammonium molybdophosphate, phosphonopyridine n-oxides, thiophosphinic acid, dithiophosphinic acid, and combinations thereof.

33. The method according to claim 28, further comprising
selecting the inorganic oxide constituent from the group consisting of silicon dioxide, aluminum oxide, titanium oxide, zirconium oxide, boron oxide, and combinations thereof; and
selecting the metal ion sequestration constituent from the group consisting of ammonium molybdophosphate, phosphonopyridine n-oxides, thiophosphinic acid, dithiophosphinic acid, and combinations thereof.

34. The method according to claim 28, further comprising disposing the membrane within a vadose zone of the ground.

35. The method according to claim 28, further comprising injecting precursor materials of the nanocomposite material into the ground to form the membrane.

36. The method according to claim 28, further comprising forming the membrane by injecting a slurry into the ground, the slurry comprising a plurality of discrete particles of the nanocomposite material dispersed in a liquid.

37. The method according to claim 36, further comprising selecting the liquid to be water.

38. The method according to claim 28, further comprising excavating a trench in the ground configured to receive the membrane therein.

39. The method according to claim 38, further comprising placing the membrane within the trench.

40. The method according to claim 28, further comprising excavating additional trenches in the ground adjacent the membrane at an angle greater than zero degrees in relation to the membrane.

41. The method according to claim 40, further comprising disposing a substantially impermeable material within the additional trenches.

42. The method according to claim 28, further comprising injecting substantially impermeable wall members within the ground adjacent the membrane.

43. A method of treating groundwater comprising:
flowing contaminated groundwater having metal ion contaminants into a permeable substantially homogeneous nanocomposite material, the permeable substantially homogeneous nanocomposite material comprising:
an inorganic oxide constituent;
a hydrophilic polymer constituent the hydrophilic polymer constituent and the inorganic oxide constituent forming an interpenetrating network, a concentration of the hydrophilic polymer constituent in the nanocomposite material configured to impart a water permeability to the membrane relative to a hydraulic conductivity of soil in which the membrane is disposed; and
a metal ion sequestration constituent substantially uniformly distributed through the interpenetrating network, the interpenetrating network and the metal ion constituent substantially defining a single phase of the substantially homogeneous nanocomposite material;
binding a portion of the metal ion contaminants present in the contaminated groundwater to the permeable substantially homogeneous nanocomposite material to produce treated groundwater, the treated groundwater having a lower amount of metal ion contaminants relative to the contaminated groundwater; and
flowing the treated groundwater out of the permeable substantially homogeneous nanocomposite material.

44. The method according to claim 43, further comprising disposing the permeable substantially homogeneous nanocomposite material within a vadose zone of the ground.

45. The method according to claim 43, further comprising disposing a portion of the permeable substantially homogeneous nanocomposite material within the water table within the ground.

46. The method according to claim 43, further comprising selecting the inorganic oxide constituent to be a metal oxide.

47. The method according to claim 43, further comprising selecting the inorganic oxide constituent from the group consisting of silicon dioxide, aluminum oxide, titanium oxide, zirconium oxide, boron oxide, and combinations thereof.

48. The method according to claim 43, further comprising formulating the metal ion sequestration constituent for chemically binding with cesium metal ions.

49. The method according to claim 43, further comprising selecting the metal ion sequestration constituent from the group consisting of ammonium molybdophosphate, phosphonopyridine n-oxides, thiophosphinic acid, dithiophosphinic acid, and combinations thereof.

50. The method according to claim 43, further comprising chemically binding the metal ion contaminants to the permeable substantially homogeneous nanocomposite material.

51. The method according to claim 43, wherein the metal ion contaminants include cesium metal ions.

52. The method according to claim 43, further comprising
selecting the inorganic oxide constituent from the group consisting of silicon dioxide, aluminum oxide, titanium oxide, zirconium oxide, boron oxide, and combinations thereof;
selecting the metal ion sequestration constituent from the group consisting of ammonium molybdophosphate, phosphonopyridine n-oxides, thiophosphinic acid, dithiophosphinic acid, and combinations thereof.

53. A permeable reactive barrier system comprising:
a membrane disposed in a flow path of water within the ground, the membrane exhibiting a permeability substantially the same as a hydraulic conductivity of the ground the membrane is placed within and comprising a substantially homogenous nanocomposite material, the nanocomposite material comprising:
an inorganic oxide constituent;
a polymer constituent selected from the group consisting of polyacrylonitrile, polyethyleneoxide, polyethylene glycol, polyvinyl acetate, polyvinyl alcohol, and combinations thereof, the polymer constituent and the inorganic oxide constituent forming an interpenetrating network; and
a metal ion sequestration constituent substantially uniformly distributed through the interpenetrating network.

54. A permeable reactive barrier system comprising:
a membrane disposed in a flow path of water within the ground, the membrane comprising a plurality of discrete particles comprising a substantially homogenous nanocomposite material, the nanocomposite material comprising:
an inorganic oxide constituent;
a polymer constituent selected from the group consisting of polyacrylonitrile, polyethyleneoxide, polyethylene glycol, polyvinyl acetate, polyvinyl alcohol, and combinations thereof, the polymer constituent and the inorganic oxide constituent forming an interpenetrating network; and
a metal ion sequestration constituent substantially uniformly distributed through the interpenetrating network.

55. A method of making a permeable reactive barrier system comprising:
injecting precursor materials of a nanocomposite material into the ground in a flow path of water within the ground; and
forming a membrane from the precursor materials, the membrane comprising a substantially homogeneous nanocomposite material, the nanocomposite material comprising:
an inorganic oxide constituent;
a polymer constituent selected from the group consisting of polyacrylonitrile, polyethyleneoxide, polyethylene glycol, polyvinyl acetate, polyvinyl alcohol, and combinations thereof, the polymer constituent and the inorganic oxide constituent forming an interpenetrating network; and
a metal ion sequestration constituent substantially uniformly distributed through the interpenetrating network.

* * * * *